United States Patent Office 3,215,632
Patented Nov. 2, 1965

3,215,632
LUBRICATING COMPOSITIONS
Robert Ivor Hughes, Walnut Creek, and Frederick M. Fowkes, Orinda, Calif., assignors to Shell Oil Company, New York, N.Y., a corporation of Delaware
No Drawing. Filed June 22, 1962, Ser. No. 204,592
2 Claims. (Cl. 252—51.5)

This invention relates to improved hydrocarbon lubricants, and particularly to mineral lubricating oil compositions which possess outstanding detergent and dispersant properties and are also stable and inhibit wear, corrosion and rust.

It is known that certain high molecular weight non-ash forming nitrogen-containing polymeric compounds such as copolymers of vinylpyridine or vinyl pyrrolidone and other polymerizable nitrogen-free compounds such as acrylate esters, e.g. copolymer of a vinylpyridine and a $C_{14-18}$ alkyl methacrylate, can function as detergents when added in small amounts to lubricants such as mineral lubricating oils. However, lubricants containing polymeric detergents of this type are primarily effective within narrow temperature range and in engines operating over a wide temperature range and under extreme pressures they become shear unstable, their detergent life rapidly decreases resulting in sludge formation, corrosion and wear of metal parts.

It has now been discovered that detergent life of lubricating oil compositions can be substantially increased and their tendency to sludge or cause corrosion and wear inhibited, as well as preventing ring sticking and plugging even when subjected to wide temperature ranges and extreme pressures by incorporating in such lubricating oils, minor amounts of two dissimilar polymeric detergents which are: (A) an oil-soluble highly basic polyamino containing polymeric detergents having a basic amine nitrogen content of from about 0.3% to about 8.0%, preferably between 0.6% and 6% basic amine nitrogen, and a molecular weight range of from about 1500 to about 2,000,000 preferably between about 3000 and about 850,000 and (B) an oil-soluble acidic polymeric detergent in the molecular weight range of from about 25,000 to about 2,000,000, preferably between 50,000 and 500,000 comprising of a long linear polymeric hydrocarbon backbone chain containing oil-solubilizing $C_{8-30}$ alkyl radicals and randomly or uniformly distributed and directly attached or indirectly attached to the linear back-bone chain through a carbon chain having from 1 to 4 carbon atoms and acid forming groups such as carboxyl, hydroxyl, nitrile, thiol, acidic phosphorus, sulfonic acid groups and the like. Preferred are acidic detergent polymeric compounds in the molecular weight range of from 50,000 to 500,000 and having a plurality of carboxyl radicals attached directly to carbons of linear hydrocarbon backbone chain. The two copolymers (A) and (B) are present in definite ratios which may vary from 1:50 to 50:1 respectively, although preferred ratios of (A) to (B) copolymers are 1:10 to 10:1 or 1:6 to 1:4 respectively. The two copolymers (A) and (B) totally are present in a base lubricant in amounts ranging from about 0.1% to 10%, preferably from about 0.2% to about 5% by weight.

The basic amino nitrogen containing polymeric detergent (A) useful in compoistions of the present invention include copolymers of monomers having polymerized linkages and containing basic amino nitrogen-containing groups which may be amino or amino-imide groups. By basic amino containing polymers is meant amino nitrogen containing polymers have a nitrogen content as indicated and a pKa value ranging from about 3.2 to about 12, preferably between about 4.5 and about 10 calculated from the Hammett acidity function ($H_0$) using the formula $$H_0 = pKa + \log\left(\frac{C_B}{C_{BH^+}}\right)$$

and using phenylazonaphtylamine-arylphosphate e.g. ditotyl phosphate as the indicator.

Polymers of this may be derived from polymerizable monomers containing primary, secondary or tertiary (the latter two are preferred) amino nitrogen, including heterocyclic amino containing substances, having an ethylenically unsaturated polymerizable group. These detergent polymers may be obtained by polymerizing vinyl substituted heterocyclic amino nitrogen-containing substances such as vinylpyridine, or polyamines prepared by reducing, in the presence of ammonia or primary or secondary amines, with polymerizable unsaturated alcohols, acids or esters such as acrylates and methacryates of long chain fatty acids, and the like. The preferred polymeric amino compounds are those containing tertiary amine groups and particularly those containing heterocyclic amino groups such as obtained by copolymerizing a polymerizable heterocyclic nitrogen base compound with a polymerizable unsaturated material free of heterocyclic nitrogen-containing radicals which can be illustrated by: copolymers of stearyl methacrylate, lauryl methacrylate and 2-methyl-5-vinylpyridine; and those which contain additional $C_{1-4}$ alkyl methacrylates in the polymer, such as copolymers of stearyl methacrylate, lauryl methacrylate, methyl methacrylate and 2-methyl-5-vinylpyridine; and similar copolymers in which the methyl methacrylate is replaced by butyl methacrylate and 2-methyl-5-vinylpyridine is replaced by 5-ethyl-2-vinylpyridine. Other suitable polymeric amine detergent copolymers of $C_{8-18}$ alkyl acrylates, e.g. lauryl methacrylate and amino alkyl acrylates, e.g. diethylaminoethylmethacrylate. Also suitable are pyrrolidone or similar copolymers as described in Belgian Patent 550,442 and British Patent 808,664, and mixtures thereof. Acrylate vinyl pyrrolidone copolymers are sold by Rohm and Haas under the designations Acryloid 315X or 917 or 966 and are copolymers of N-vinyl pyrrolidone and lauryl methacrylate of varying molecular weights.

Still another class of (A) basic amino nitrogen-containing detergent polymers are polymeric amino-imide-containing detergents such as N-dialkylamino alkyl alkenyl succinimides and illustrated by N-dimethylaminopropyl polybutenyl succinimide, or tetraethylenepentamine derivative of polybutenyl succinic anhydride and the like.

Preferred basic amino detergent polymers are illustrated by the following examples.

EXAMPLE I

A mixture of 25% of 2-methyl-5-vinylpyridine and 75% stearyl methacrylate were heated in a 50–50 mixture of benzene and light mineral oil (East Texas 100 SSU at 100° F. neutral) to about 120° C. at which time 0.25% wt. of ditert.butyl peroxide was added and the reaction mixture was maintained at this temperature for about 6 hours.

At the completion of the reaction, the solvent was stripped off and the polymer diluted with neutral oil to a polymer content of about 30% by weight and filtered at 100–120° C. The copolymer had a molecular weight of about 200,000 and a nitrogen content of 2.94%.

EXAMPLE II

30% stearyl methacrylate, 51% lauryl methacrylate, 14% methyl methacrylate and 5.0% 2-methyl-5-vinylpyridine were charged to a 300-gallon stainless steel autoclave. A 50–50 mixture of benzene and neutral petroleum oil was then added to the autoclave so as to furnish 1 part of the mixture per 3 parts of the total monomer. 0.25% of ditert.butyl was then added and the mixture heated at 120° C. for about 7 hours.

At the completion of the reaction, the benzene was stripped off to final conditions of 120° C. and 10 mm. Hg with nitrogen purging. The benzene-free product was then diluted with neutral oil to a polymer content of about 30% by weight and filtered at 100–120° C. The polymer has a molecular weight of about 600,000, a nitrogen content of 0.54% and a pKa value of 4.8.

EXAMPLE III

A mixture of 1000 gms. (1 mole) of a polybutene having a molecular weight of about 1000 and 98 gms. (1 mole) of maleic anhydride was heated at 410° F. in a nitrogen atmosphere with agitation for a period of 24 hours. The reaction mixture was cooled to 150° F. and 700 cc. of hexane added; after which the mixture was filtered under vacuum. After vacuum distillation to remove the hexane from the filtrate, the product was maintained at 350° F. at an absolute pressure of 10 mm. Hg for one hour to remove traces of maleic anhydride. The crude polybutenyl succinic anhydride thus prepared had a saponification number of 79.

EXAMPLE IIIa.—PREPARATION OF TETRAETHYLENEPENTAMINE DERIVATIVE OF THE POLYBUTENYL SUCCINIC ANHYDRIDE OF EXAMPLE III HEREINABOVE

A mixture of 84 gms. (0.45 mol) of tetraethylenepentamine and 702 gms. (0.45 mol) of the polybutenyl succinic anhydride of Example II hereinabove, was blended with agitation at 125° F. in a nitrogen atmosphere. The temperature was increased to 400° F. during a period of one hour, after which the absolute pressure was reduced to about 200 mm. Hg during a period of 30 minutes to facilitate the removal of water. The reaction mixture was then allowed to reach room temperature at this reduced pressure. The reaction product contained 5.1% nitrogen (theory=5.4%). Infra-red analysis showed that the reaction product was imide containing a polybutene side chain.

EXAMPLE IV

A mixture 21.3 gms. (0.21 mole) of dimethylaminopropylamine and 150 gms. (0.09 mol) of the polybutenyl succinic anhydride of Example II hereinabove, was blended with agitation in a nitrogen atmosphere, and the mixture was heated at 500° F. for a period of one hour, after which the absolute pressure was reduced to about 200 mm. Hg at this temperature during a period of 30 minutes to facilitate the removal of water and excess amine. The reaction mixture was then allowed to reach room temperature at this reduced pressure. The reaction product contained 1.7% nitrogen (theory 1.8%) and pKa value of 9–10. The identity of the N-dimethylaminopropylalkenyl succinimide was established by means of infra-red spectroscopy.

EXAMPLE V

Polyisobutylene succinic anhydride was prepared by reacting a polyisobutylene (M.W. 850) and succinic anhydride at around 400° F. About 500 gms. of polyisobutylene succinic anhydride thus formed was admixed with 50 gms. of diethylenetriamine in toluene at ambient temperature. The amine was added in increments and the temperature controlled so as not to rise above about 120° F. The reaction proceeded for 15 to 30 minutes after which the solvent was removed and the end product, a semi-amide of the above reactants, had a nitrogen content of 1.6%.

EXAMPLE VI.—TETRAETHYLENE PENTAMINE DIIMIDE OF MONO(POLYISOBUTYLENE)SUCCINIC ACID

Polyisobutylene having a molecular weight of 1185 and bromine number of 21 was heated to 212° F. and an equivalent amount of maleic anhydride was added slowly over a period of about 30 minutes. The reactants were heated to 390° F. to 400° F. and maintained at this temperature for 16 hours. On cooling, mono(polyisobutylene)succinic anhydride was recovered by dissolving in 1.5 liters of petroleum spirit (60–80° C. B.P.) and recovering the product by filtering. About 2 moles of this product was admixed with one mole of tetraethylene pentamine and added to a petroleum spirit solution. The petroleum spirit was distilled off and replaced by 1 liter of toluene which was also distilled off to azeotropically remove water, and the residue was heated to 390° F. to 400° F. and maintained at this temperature for three hours. The recovered product, tetraethylenetriamine diimide of mono(polyisobutylene)succinic acid.

The acidic polymeric detergents (B) include copolymers of $C_{8-20}$ alkyl acrylates or vinyl esters of $C_{8-18}$ aliphatic carboxylic acids and free polymerizable mono or dicarboxylic organic acids or anhydrides, such as acrylic acid, methacrylic acid, citraconic acid, itaconic acid, maleic acid, fumaric acid, maleic anhydride or other types of polymerizable acidic compounds, e.g. vinyl acid phosphates, vinyl phosphonates, vinyl sulfonates, polyvinyl alcohol and mixtures. Such polymers are readily prepared by the methods well known in the art such as illustrated by French Patent 1,228,353, British Patent 833,977 and U.S. Patents 2,992,184 and 3,010,906. Preferred acidic detergent polymers of class (B) copolymers are copolymers derived from a mixture of $C_{8-20}$ alkyl maleate or fumarate and free maleic acid or maleic anhydride such as a copolymer of hexadecyl and octadecyl esters of maleic or fumaric acids, vinyl acetate and maleic anhydride. An example of such acidic polymeric detergent is ($I_1$) a copolymer of vinyl acetate, maleic anhydride and mixture of n-hexadecyl and n-octadecyl fumarates prepared under conditions described in French Patent 1,228,353 such that the fumarates comprise 80–40% and the balance of the mixture of 20–60% being vinyl acetate and maleic anhydride. Another example ($II_1$) of an acidic detergent polymer is an ethoxylated partial ester of $C_{9-18}$ alkyl maleate and vinyl acetate prepared by reacting partial ester of $C_{9-18}$ alkyl maleate (acid No. 90) with ethylene oxide in presence of benzoyl peroxide at around 70° C. for about an hour. Other examples of acidic detergent polymers are shown below and can be prepared by reacting the monomers in a hydrocarbon solvent e.g. benzene in presence of organic peroxide e.g. benzoyl peroxide, at around 200–250° F. for about 24–96 hours. The reaction product is stripped by known means to yield the desired copolymer.

($III_1$) Copolymer of stearyl methacrylate/lauryl methacrylate/hydroxyethylethacrylate/methacrylic acid (5:5:2:1)[1]

($III_2$) Copolymer of lauryl maleate/methacrylic acid (10:1)

($III_3$) Copolymer of dodecyl methacrylate/alkyl stearate/maleic anhydride (20:1:1)

($III_4$) Vinyl stearate/itaconic acid (20:1)

($III_5$) Vinyl stearate/maleic anhydride/decyl methacrylate (1:5:1)

---
[1] Mole ratio.

(III₆) Lauryl fumarate/crotonic acid/octadecyl methacrylate (20:1:10)

(III₇) Dodecyl methacrylate/maleic anhydride (1:1)

(III₈) Vinyl acetate/octadecyl maleate/maleic anhydride (10:10:1)

(III₉) Octadecyl methacrylate/alkyl alcohol/maleic anhydride (5:1:1)

(III₁₀) Octadecyl methacrylate/polyvinyl alcohol/maleic anhydride (10:1:1)

Polymers of III₁₋₁₀ range in molecular weight from 100,000 to 450,000.

Illustrative examples of basic amino-containing polymeric detergents (A) and acidic polymeric detergents (B) mixtures are as follows:

| Example | Basic Polymers (A) | Acidic Polymers (B) |
|---|---|---|
| (L) | Example II + | Example I₁ (1:4) ¹ |
| (M) | Example II + | Example II₁ (1:4) |
| (N) | Example IIIa + | Example I₁ (1:4) |
| (O) | Example II + | Example I₁ (1:1) |
| (P) | Example IV + | Example I₁ (1:4) |
| (Q) | Example IV + | Example III₁ (1:2) |
| (R) | Example II + | Example III₃ (1:2) |
| (S) | Example II + | Example III₅ (1:4) |
| (T) | Example II + | Example III₉ (1:4) |
| (U) | Example II + | Example I (2:1) |

¹ Ratio by weight.

The other additives which can be used in combination with the essential polymeric additive mixture (A) and (B) of this invention are alkylated bisphenol having the formula:

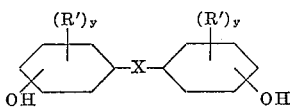

wherein R' is a hydrocarbyl radical, preferably a C₁₋₈ alkyl radical, y is an integer of 1 to 4, preferably 1 or 2, X stands for —S— —S—S—, Se, —S—CH₂—, —CH₂—S+CH₂—, —CHR—, CR₂—, —(CH₂)ₘ—, —NH—, —O—, and wherein R stands for methyl or ethyl and m stands for an integer from 1 to 3. The preferred alkylated bisphenols are those having a sulfur bridge or a methylene bridge.

The alkylated bisphenols may contain from 1 to 8 alkyl groups, but preferably they contain from 2 to 6 alkyl groups. Alkylated bisphenols having 4 alkyl groups are particularly preferred. Each of the alkyl groups may contain from 1 to 10 carbon atoms, preferably 2 to 6 carbon atoms and especially 4 carbon atoms. Furthermore, the alkyl groups contained by any particular bisphenol may be the same or different and may also be primary, secondary or tertiary alkyl groups. Bisphenols containing at least one tertiary alkyl group are particularly preferred.

As examples of the alkylated bisphenols which may be used according to the invention there are mentioned bis (3-ethyl-4 - hydroxyphenyl)disulfide, bis(3-methyl-4-propyl-5-hydroxyphenyl)disulfide, bis(2 - isopropyl-3-butyl-5-hydroxyphenyl)selenide, 2,2'-diethyl-3-tertiary butyl-4,4'-dihydroxy diphenyl selenide, bis 1,2(2,6-ditertiary butyl-4-hydroxyphenyl)thiaethane, bis-1,2(2,5) - di-isopropyl-3-hydroxyphenyl)thiaethane, bis(3,5-di-tertiary butyl-4-hydroxyphenyl)sulfide, 2,4-di-isobutyl-3 - hydroxybenzyl-2', 4'-dipropyl-3' - hydroxy-benzyl sulfide, bis-1,2(2-octyl-5'-tertiary butyl-4-hydroxyphenyl)ethane, bis-1,1(2,6-di-isopropyl-4 - hydroxyphenyl)ethane, 1,2-bis(2,4 - di-tertiary pentyl-3 - hydroxyphenyl)propane, bis 2,2(4,5-di-tertiary butyl-2-hydroxyphenyl)propane, bis(2-tertiary butyl-5-isopentyl-4 - hydroxyphenyl)amine, bis(3,5 - dibutyl-4-hydroxyphenyl)ether, bis(2,6-dipropyl-4 - hydroxyphenyl) ether. Examples of alkylated bis-phenols having a sulfur bridge are bis(2,5-dipentyl-4-hydroxyphenyl)sulfide, bis(2,5-dihexyl-3 - hydroxyphenyl)sulfide, bis(2-methyl-5- tertiary butyl-4 - hydroxyphenyl)sulfide, bis(2-methyl-5-tertiary butyl-6-hydroxyphenyl)sulfide and particularly bis(3-tertiary butyl-5 - methyl-2 - hydroxyphenyl)sulfide. Example of alkylated bis-phenols having a methylene bridge are bis(2,3 - di-tertiary butyl-4 - hydroxyphenyl) methane, bis(2,5-di-tertiary butyl-4-hydroxyphenyl)methane, bis(2,6-di-tertiary butyl-4 - hydroxyphenyl)methane, bis(3,5-di-tertiary octyl-4-hydroxyphenyl)methane, bis(3-tertiary butyl-5-tertiary octyl-4-hydroxyphenyl)methane, and especially bis(3,5-di-tertiary butyl-4-hydroxyphenyl) methane, (3,5-ditert-butyl-3',5' - dimethyl-4,4'-dihydroxydiphenyl)methane, (3,5-ditert-butyl-3',5' - diisopropyl-4, 4'-dihydroxydiphenyl)methane, 3,5,3',5'-ditert-butyl-2,4'-dihydroxydiphenyl)methane.

The alkylated bisphenol may be prepared by any of the methods known in the art of bisphenol manufacture, for example, by selecting the appropriate alkylated phenols as starting materials and condensing them together by any of the established methods.

The bisphenols may be used in amounts of from 0.1% to 5%, preferably from 0.5% to 1% by weight.

The lubricating oil compositions according to the invention may be further improved by addition of small amounts of other additives which are metal-free organic phosphorus-containing compounds such as alkyl, cycloalky, alkaryl, aralkyl, and aryl phosphites, phosphates, phosphonates, and their thio-derivatives, such as C₃₋₁₈ alkyl phosphites, e.g. di and tributyl, octyl, lauryl, stearyl, cyclohexyl, benzyl, cresyl, phenyl phosphites or phosphates, as well as their thio-derivatives; P₂S₅-terpene reaction product; organo phosphonates, e.g. dibutyl methanephosphonate, dibutyl trichloromethanephosphonate, dibutyl monochloromethanephosphonate, dibutyl chlorobenzenephosphonate, dibutyl monochloromethanephosphonate and the like. The esters of pentavalent phosphorus acids as diphenyl, dicresyl, triphenyl, tricresyl, trilauryl and tristearyl phosphate, P₂S₅-terpene reaction products and mixtures thereof are preferred.

The phosphorus compounds may be used in amounts of from 0.01% to 5%, preferably from 0.1% to 1% by weight.

Lubricating oils which can be used as base oils for the lubricating oil compositions according to the invention include a wide variety of lubricating oils, such as naphthenic base, paraffin base, and mixed base lubricating oils, other hydrocarbon lubricants, e.g. lubricating oils derived from coal products, and synthetic oils, e.g., ethyl alcohol, dicarboxylic acid esters (e.g. those which are prepared by esterifying such dicarboxylic acids as adipic acid, azelaic acid, suberic acid, sebacic acid, succinic acid, fumaric acid, maleic acid, pimelic acid etc., with alcohols, such as butyl alcohol, hexyl alcohol, 2-ethylhexyl alcohol, dodecyl alcohol, etc.) liquid esters of acids of phophorus, alkyl benzenes, polyphenyls (e.g. biphenyls and terphenyls), alkyl biphenyl ethers, polymers of silicon (e.g. tetraethyl silicate, tetra-isopropyl silicates, tetra(4-methyl-2-tetraethyl)silicate, hexyl(4-methyl-2-pentoxy)disiloxane, poly(methyl)siloxane, and poly(methylphenyl)siloxane. These base oils may be used individually or in combinations.

The following non-ash lubricating compositions are representative of the invention:

*Composition A*

| | Percent |
|---|---|
| Example L additive mixture | 2 |
| Mineral lubricating oil (SAE 20) | Balance |

*Composition B*

| | |
|---|---|
| Example M additive mixture | 2 |
| Mineral lubricating oil (SAE 20) | Balance |

*Composition C*

| | |
|---|---|
| Example N additive mixture | 2 |
| Mineral lubricating oil (SAE 20) | Balance |

Composition D

| | Percent |
|---|---|
| Example L additive mixture | 2 |
| Bis(3,5-ditert-butyl-4-hydroxyphenyl)methane | 0.75 |
| Mineral lubricating oil (SAE 20W–30) | Balance |

Composition E

| | |
|---|---|
| Example L additive mixture | 2 |
| Bis(3,5-ditert-butyl-4-hydroxyphenyl)methane | 0.75 |
| Tricresylphosphate | 0.5 |
| Mineral lubricating oil (SAE 20) | Balance |

Composition F

| | |
|---|---|
| Example R additive mixture | 1 |
| Bis(3,5-ditert-butyl-4-hydroxyphenyl)methane | 0.75 |
| Tricresylphosphate | 0.5 |
| Mineral lubricating oil (SAE 20) | Balance |

Composition G

| | |
|---|---|
| Example P additive | 1.5 |
| Bis(3,5-ditert-butyl-4-hydroxyphenyl)methane | 0.75 |
| Tricresylphosphate | 0.5 |
| Mineral lubricating oil (SAE 20) | Balance |

Composition H

| | |
|---|---|
| Example L additive mixture | 2 |
| Bis(3,5-ditert-butyl-4-hydroxyphenyl)methane | 0.75 |
| Tricresylphosphate | 0.80 |
| Dicresylphosphate | 0.04 |
| Mineral lubricating oil (SAE 10W–30) | Balance |

Compositions of this invention were tested for their detergency and dispersancy properties by adding 0.02% carbon black to a test composition and suspending into said test oil at both ambient temperature and at 110° C. a strip of filter paper of set dimensions and observing the high and depression of the carbon band formed on the filter paper. Compositions A, C, D, E and H exhibited at both temperatures detergency effectiveness of 2 to 3 times that of compositions containing only one of said polymer such as compositions:

Compositions X=mineral oil+2% Example II (A) copolymer,
Compositions Y=mineral oil+2% Example $I_1$ (B) copolymer,
Compositions Z=mineral oil+2% Example III (A) copolymer,
Compositions XX=mineral oil+2% Example IV (A) copolymer,
Compositions YY=mineral oil+2% Example $II_1$ (B) copolymer,
Compositions ZZ=mineral oil+2% Example $III_5$ (B) copolymer.

Also in engine tests such as the LS-3 Cadillac engine test modified as follows: 100 hours, 400 repeating cycles of 15 minutes each comprising of 1 minute 90° F. jacket temperature, 10 minutes at 135° F. jacket temperature, 2500 r.p.m. and 4 minutes at 190° F. jacket temperature at 3200 r.p.m.; operated on high sulfur fuel, compositions A, C, D, and H passed the 100 hour test and prevented oil ring plugging, left oil rings clean and the engine was in excellent condition whereas compositions X, Y, Z and XX failed within 50 hours.

Other additives may also be incorporated into the lubricating composition according to the invention, for example anti-scuffing agents; anti-foaming agents, e.g. silicone polymers; viscosity index improvers, for example polymeric acrylic esters of the Acryloid 150 and 710 class; extreme pressure additive, such as; dibenzyl disulfide, rust inhibitors, such as sorbitan monoleate or butyl stearate; oiliness agents, such as acidiless tallow, oleic acid and the like.

We claim as our invention:

1. A mineral lubricating oil composition comprising a major amount of mineral lubricating oil and from about 1.2 to about 5% by weight each of (A) an oil-soluble copolymer of a C-vinyl pyridine and a mixture of esters of an acrylic acid and long chain aliphatic hydrocarbon alcohol having from 8 to 18 carbon atoms, and an ester of an acrylic acid and a lower alkanol having from 1 to 4 carbon atoms, said copolymer having C-vinylpyridine and the total ester mixture in a mole ratio of about 1:20 with the lower alkyl ester making up from 10 to 45 mol percent of the total ester mixture, and the said copoylmer having an average molecular weight from $5 \times 10^4$ to $2.5 \times 10^6$ and (B) an oil-soluble copolymer of $C_{8-20}$ alkyl fumarate, vinyl acetate and maleic anhydride, the $C_{8-20}$ alkyl fumarate comprising 80–40% and the balance of the mixture of 20–60% being the vinyl acetate and maleic anhydride, having a molecular weight of from 50,000 to 500,000, the ratio of (A) to (B) being 1:1 to 1:4 respectively.

2. A mineral lubricating oil comprising a major amount of mineral lubricating oil and from about 0.01 to about 5% by weight each of (A) copolymer of 2-methyl-5-vinylpyridine, and a mixture of lauryl methacrylate, stearyl methacrylate, and methyl methacrylate, the said coplymer having the vinylpyridine and total acrylate esters in a mol ratio of about 1:20, the amount of the methyl methacrylate being 10 to 45 mol percent of the total acrylate esters and the copoylmer having a molecular weight varying from about 100,000 to 850,000 and (B) copolymer of vinyl acetate, $C_{8-20}$ alkyl fumarate and maleic anhydride, the $C_{8-20}$ alkyl fumarate comprising 80–40% and the balance of the mixture of 20–60% being vinyl acetate and maleic anhydride, having a molecular weight of from 100,000 to 500,000, the ratio of (A) to (B) being 1:4 respectively.

References Cited by the Examiner

UNITED STATES PATENTS

| | | | |
|---|---|---|---|
| 2,839,512 | 6/58 | Barnum et al. | 252—51.5 X |
| 2,892,792 | 6/59 | Stewart et al. | 252—56 |
| 2,892,793 | 6/59 | Stewart et al. | 252—56 |
| 2,993,032 | 7/61 | Stuart et al. | 252—56 |
| 3,010,906 | 11/61 | Signouret et al. | 252—56 |
| 3,018,250 | 1/62 | Anderson et al. | 252—51.5 |
| 3,030,303 | 4/62 | Ryan | 252—51.5 X |
| 3,052,630 | 9/62 | Anderson | 252—51.5 X |
| 3,087,893 | 4/63 | Agius et al. | 252—56 |

OTHER REFERENCES

Georgi: "Motor Oils and Engine Lubrication," Reinhold Pub. Co., 1950, pages 190–191 pertinent.

DANIEL E. WYMAN, *Primary Examiner.*

JULIUS GREENWALD, *Examiner.*